US010444792B2

(12) United States Patent
Tang

(10) Patent No.: US 10,444,792 B2
(45) Date of Patent: Oct. 15, 2019

(54) UNLOCKING CONTROL SYSTEM, METHOD AND WEARABLE DEVICE USING THE SAME

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Hai-Ping Tang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 226 days.

(21) Appl. No.: 15/603,423

(22) Filed: May 23, 2017

(65) Prior Publication Data

US 2017/0344737 A1 Nov. 30, 2017

(30) Foreign Application Priority Data

May 24, 2016 (CN) .......................... 2016 1 0349060

(51) Int. Cl.
*G06F 21/34* (2013.01)
*G06F 1/16* (2006.01)
*G06F 21/35* (2013.01)

(52) U.S. Cl.
CPC .............. *G06F 1/163* (2013.01); *G06F 21/35* (2013.01)

(58) Field of Classification Search
CPC ........... G06F 21/35; G06F 1/163; G06F 21/34
See application file for complete search history.

(56) References Cited

U.S. PATENT DOCUMENTS

2016/0080154 A1\* 3/2016 Lee ....................... H04L 9/3234
713/185
2017/0012994 A1\* 1/2017 Choi ................... H04L 63/0853

\* cited by examiner

*Primary Examiner* — Baotran N To
(74) *Attorney, Agent, or Firm* — ScienBiziP, P.C.

(57) ABSTRACT

An unlocking control method is applied in a wearable device and a lockable electronic device. The wearable device communicates with the electronic device and can be bound to it. The wearable device can produce an unlocking setting instruction to set an unlocking mode of the electronic device, and can send the unlocking setting instruction to the bound electronic device. The wearable device can set the unlocking mode of the electronic device and produce an unlocking control instruction, sending the unlocking control instruction to the electronic device. The electronic device receives the unlocking control instruction, and is controlled to unlock itself according to the received unlocking control instruction and the unlocking mode of the electronic device.

9 Claims, 8 Drawing Sheets

US 10,444,792 B2

UNLOCKING CONTROL SYSTEM, METHOD AND WEARABLE DEVICE USING THE SAME

CROSS-REFERENCE TO RELATED APPLICATIONS

This application claims priority to Chinese Patent Application No. 201610349060.3 filed on May 24, 2016, the contents of which are incorporated by reference herein.

FIELD

The subject matter herein generally relates to security of electronic products, especially relates to an unlocking control system, an unlocking control method and a wearable device using the same.

BACKGROUND

Traditional unlocking mode of an electronic device includes a sliding to unlock mode, a pattern matching mode, or a fingerprint recognition mode. However, the above unlocking modes are easily cracked, thus improvements in the art of protecting user's personal information and confidential information is necessary.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
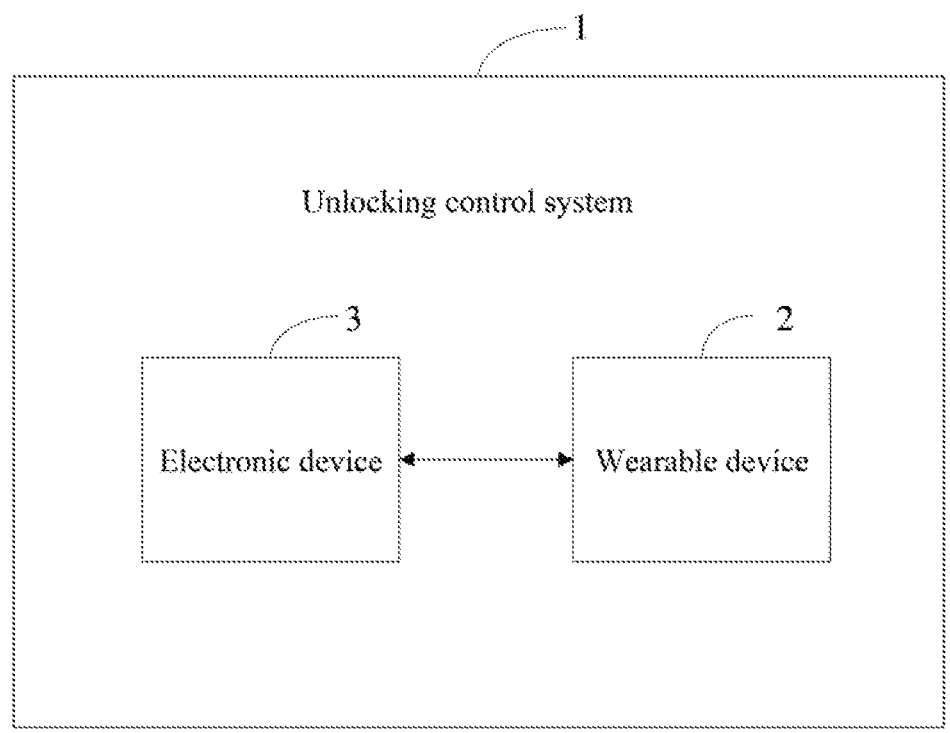
FIG. 1 is a block diagram of an exemplary embodiment of an operating environment of an unlocking control system.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" exemplary embodiment in this disclosure are not necessarily to the same exemplary embodiment, and such references mean "at least one."

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates an operating environment of an unlocking control system 1. The system 1 is applied in a wearable device 2 and an electronic device 3. The system 1 is used to control the electronic device 3 to communicate with the wearable device 2, bind the electronic device 3 with the wearable device 2, set an unlocking mode of the electronic device 3 according to an unlocking setting instruction sent from the wearable device 2, and unlock the electronic device 3 according to an unlocking control instruction sent from the wearable device 2 and the unlocking mode of the electronic device 3. In at least one exemplary embodiment, the wearable device 2 can be, but is not limited to, a smart bracelet or a smart watch. The electronic device 3 can be, but is not limited to, a smart phone or a tablet computer.

Figure 2:
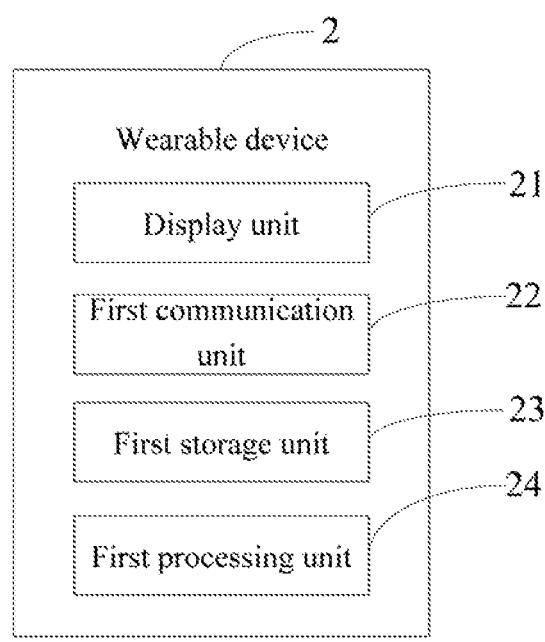
FIG. 2 is a block diagram of an exemplary embodiment of a wearable device of the system of FIG. 1.

FIG. 2 illustrates the wearable device 2 of FIG. 1. The wearable device 2 includes a display unit 21, a first communication unit 22, a first storage unit 23, and a first processing unit 24. The first processing unit 24 controls the wearable device 2 to communicate with the electronic device 3 by the first communication unit 22, and binds the wearable device 2 with the electronic device 3. The first processing unit 24 produces the unlocking setting instruction, sends the unlocking setting instruction to the electronic device 3, and unlocks the electronic device 3. In at least one exemplary embodiment, the first processing unit 24 can be a central processing unit (CPU), a microprocessor, or other data processor chip that performs functions of the unlocking control system 1. In at least one exemplary embodiment, the display unit 21 is a touch screen. The first communication unit 22 can be a BLUETOOTH communication module, a WI-FI communication module, or an infrared communication module. The first storage unit 23 stores a first identifier representing identification information of the wearable device 2. In at least one exemplary embodiment, the first identifier includes a number of characters and numbers.

In at least one exemplary embodiment, the first storage unit 23 can include various types of non-transitory computer-readable storage mediums. For example, the first storage unit 23 can be an internal storage system of the wearable device 2, such as a flash memory, a random access memory (RAM) for temporary storage of information, and/or a read-only memory (ROM) for permanent storage of information. The first storage unit 23 can also be an external storage system, such as a hard disk, a storage card, or a data storage medium.

Figure 3:
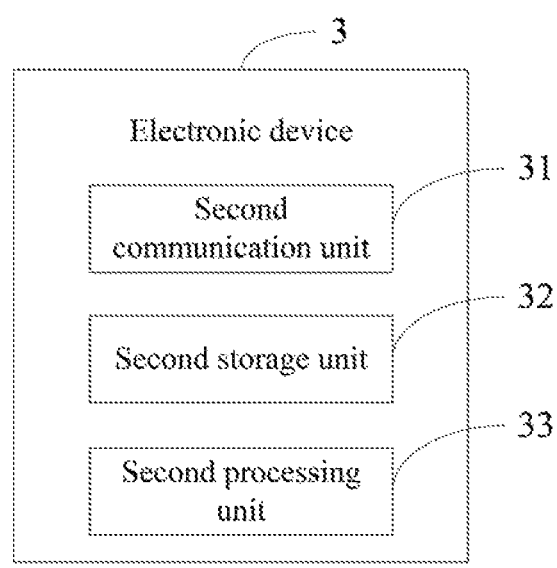
FIG. 3 is a block diagram of an exemplary embodiment of an electronic device of the system of FIG. 1.

FIG. 3 illustrates the electronic device 3. The electronic device 3 includes a second communication unit 31, a second storage unit 32, and a second processing unit 33. The second storage unit 32 stores a second identifier representing identification information of the electronic device 3. In at least one exemplary embodiment, the second storage unit 32 can be an internal storage system of the electronic device 3, such as a flash memory, a random access memory (RAM) for temporary storage of information, and/or a read-only memory (ROM) for permanent storage of information. In another exemplary embodiment, the second storage unit 32 can also be an external storage system, such as a hard disk, a storage card, or a data storage medium. The second communication unit 31 can be a BLUETOOTH communication module, a Wi-Fi communication module, or an infrared communication module. The second processing unit 33 can be a central processing unit (CPU), a microprocessor, or other data processor chip that performs functions of the unlocking control system 1.

Figure 4:
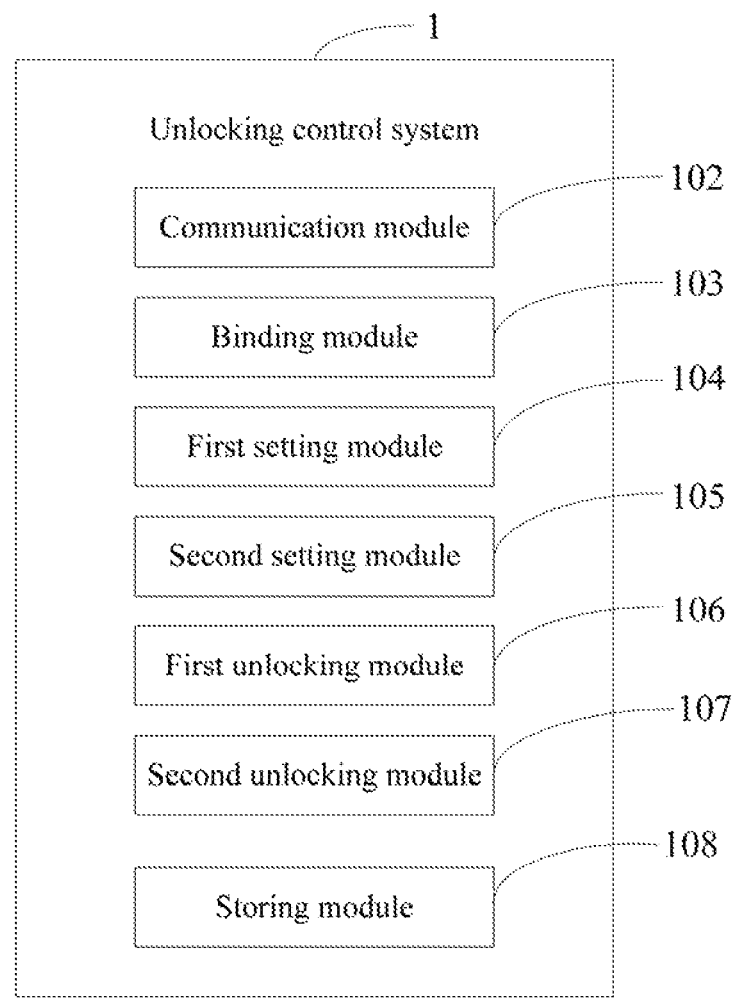
FIG. 4 is a block diagram of an exemplary embodiment of the unlocking system of FIG. 1.

FIG. 4 illustrates the unlocking system 1 of FIG. 1. The system 1 includes a number of modules, which are a collection of software instructions which can be executed by the first processing unit 24 or the second processing unit 33. In the exemplary embodiment, the modules can include a communication module 102, a binding module 103, a first setting module 104, a second setting module 105, a first unlocking module 106, a second unlocking module 107, and a storing module 108. In at least one exemplary embodiment, the communication module 102 and the binding module 103 are applied in the wearable device 2 and the electronic device 3. The first setting module 104 and the first unlocking module 106 are applied in the wearable device 2. The second setting module 105, the second unlocking module 107, and the storing module 108 are applied in the electronic device 3.

The communication module 102 is used to control the wearable device 2 to communicate with the electronic device 3 by the first communication unit 22 and the second communication unit 31.

Figure 5:
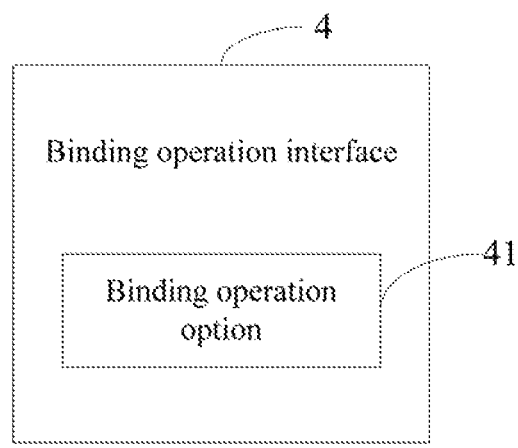
FIG. 5 is a diagram of an exemplary embodiment of a binding operation interface in the system of FIG. 1.

The binding module 103 is used to bind the wearable device 2 with the electronic device 3. In at least one exemplary embodiment, referring to FIG. 5, the binding module 103 displays a binding operation interface 4 on the display unit 21. The binding operation interface 4 defines a binding operation option 41. A user can input a binding operation by selecting the binding operation option 41. When the user inputs the binding operation by selecting the binding operation option 41, the binding module 103 produces a binding request signal including the first identifier of the wearable device 2 and sends the binding request signal to the electronic device 3. When the electronic device 3 receives the binding request signal, the binding module 103 produces a response signal including the second identifier of the electronic device 3 and sends the response signal to the wearable device 2. When the wearable device 2 receives the response signal, the binding module 103 binds the wearable device 2 with the electronic device 3 by establishing a relationship between the first identifier of the wearable device 2 and the second identifier of the electronic device 3.

Figure 6:
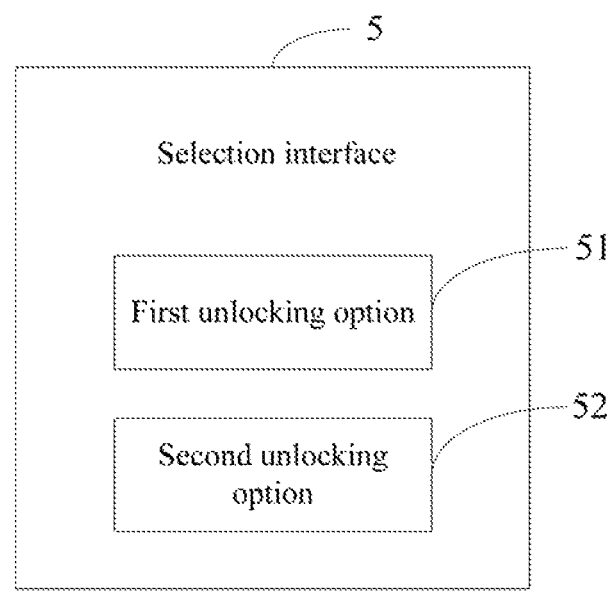
FIG. 6 is a diagram of an exemplary embodiment of a selection interface of unlocking mode in the system of FIG. 1.

The first setting module 104 is used to produce the unlocking setting instruction to set the unlocking mode of the electronic device 3, and send the unlocking setting instruction to the electronic device 3 that has been bound to the wearable device 2. In at least one exemplary embodiment, referring to FIG. 6, the first setting module 104 displays a selection interface 5 on the display unit 21 to produce the unlocking setting instruction. The selection interface 5 includes a first unlocking option 51 and a second unlocking option 52. The first setting module 104 produces a first unlocking setting instruction when the user selects the first unlocking option 51 and sends the first unlocking setting instruction to the electronic device 3. The first setting module 104 further produces a second unlocking setting instruction when the user selects the second unlocking option 52 and sends the second unlocking setting instruction to the electronic device 3. In at least one exemplary embodiment, the first unlocking setting instruction is used to set the unlocking mode of the electronic device 3 as a first unlocking mode, the second unlocking setting instruction is used to set the unlocking mode of the electronic device 3 as a second unlocking mode. The first unlocking mode can be a sliding mode, a pattern matching mode, or a fingerprint recognition mode. The second unlocking mode is the mode in which the electronic device 3 is unlocked only when the unlocking control instruction sent from the wearable device 2 is received.

The second setting module 105 is used to set the unlocking mode of the electronic device 3 according to the unlocking setting instruction sent from the wearable device 2. In at least one exemplary embodiment, the second setting module 105 sets the unlocking mode of the electronic device 3 as the first unlocking mode when the electronic device 3 receives the first unlocking setting instruction. The second setting module 105 sets the unlocking mode of the electronic device 3 as the second unlocking mode when the electronic device 3 receives the second unlocking setting instruction.

Figure 7:
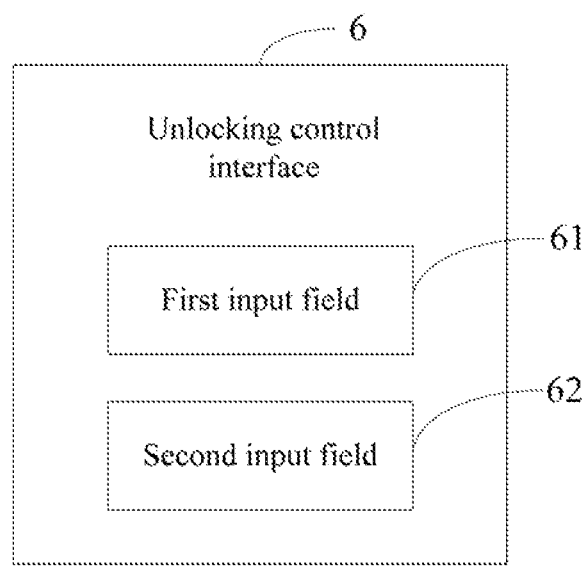
FIG. 7 is a diagram of an exemplary embodiment of an unlocking control interface in the system of FIG. 1.

The first unlocking module 106 produces the unlocking control instruction, and sends the unlocking control instruction to the electronic device 3 to unlock the electronic device 3. In at least one exemplary embodiment, referring to FIG. 7, the first unlocking module 106 displays an unlocking control interface 6 on the display unit 21 to produce the unlocking control instruction. The unlocking control interface 6 includes a first input field 61 and a second input field 62. The user can input unlocking password in the first input field 61. The user can define an initial unlocking password in the second input field 62. The first unlocking module 106 produces the unlocking control instruction when the user inputs the unlocking password in the first input field 61, and sends the unlocking control instruction to the electronic device 3 to unlock the electronic device 3. The first unlocking module 106 further sends the initial unlocking password to the electronic device 3 for storing when the user inputs the initial unlocking password in the second input field 62. In at least one exemplary embodiment, the initial unlocking password is sent to the electronic device 3 before the unlocking password being sent to the electronic device 3. The initial unlocking password and the unlocking password will be further discussed later.

The second unlocking module 107 receives the unlocking control instruction, and unlocks the electronic device 3 according to the received unlocking control instruction and the unlocking mode of the electronic device 3. In at least one exemplary embodiment, when the electronic device 3 receives the unlocking control instruction and the unlocking mode of the electronic device 3 is the first unlocking mode, the second unlocking module 107 unlocks the electronic device 3 with the first unlocking mode. The first unlocking mode can be the sliding mode, the pattern matching mode, or the fingerprint recognition mode, or a combination of these modes. The second unlocking module 107 unlocks the electronic device 3 with the sliding mode, or the pattern matching mode, or the fingerprint mode. When the electronic device 3 receives the unlocking control instruction and the unlocking mode of the electronic device 3 is the second unlocking mode, the second unlocking module 107 unlocks the electronic device 3 with the second unlocking mode. In at least one exemplary embodiment, when the electronic device 3 receives the unlocking control instruction, the second unlocking module 107 determines whether the electronic device 3 is in the second unlocking mode. When the electronic device 3 is determined to be in the second unlocking mode, the second unlocking module 107 unlocks the electronic device 3 according to the unlocking control instruction sent from the wearable device 2. When the electronic device 3 is determined to be in the first unlocking mode, the second unlocking module 107 produces a prompt message on the display unit 21 to prompt a user to unlock the electronic device 3 with the first unlocking mode.

The storing module 108 is used to store the initial unlocking password sent from the electronic device 3. In at least one exemplary embodiment, the unlocking control instruction can be an unlocking password. When the electronic device 3 is in the second unlocking mode and receives the unlocking password, the storing module 108 compares the unlocking password with the initial unlocking password, and unlocks the electronic device 3 if the unlocking password is matched with the initial unlocking password.

Figure 8:
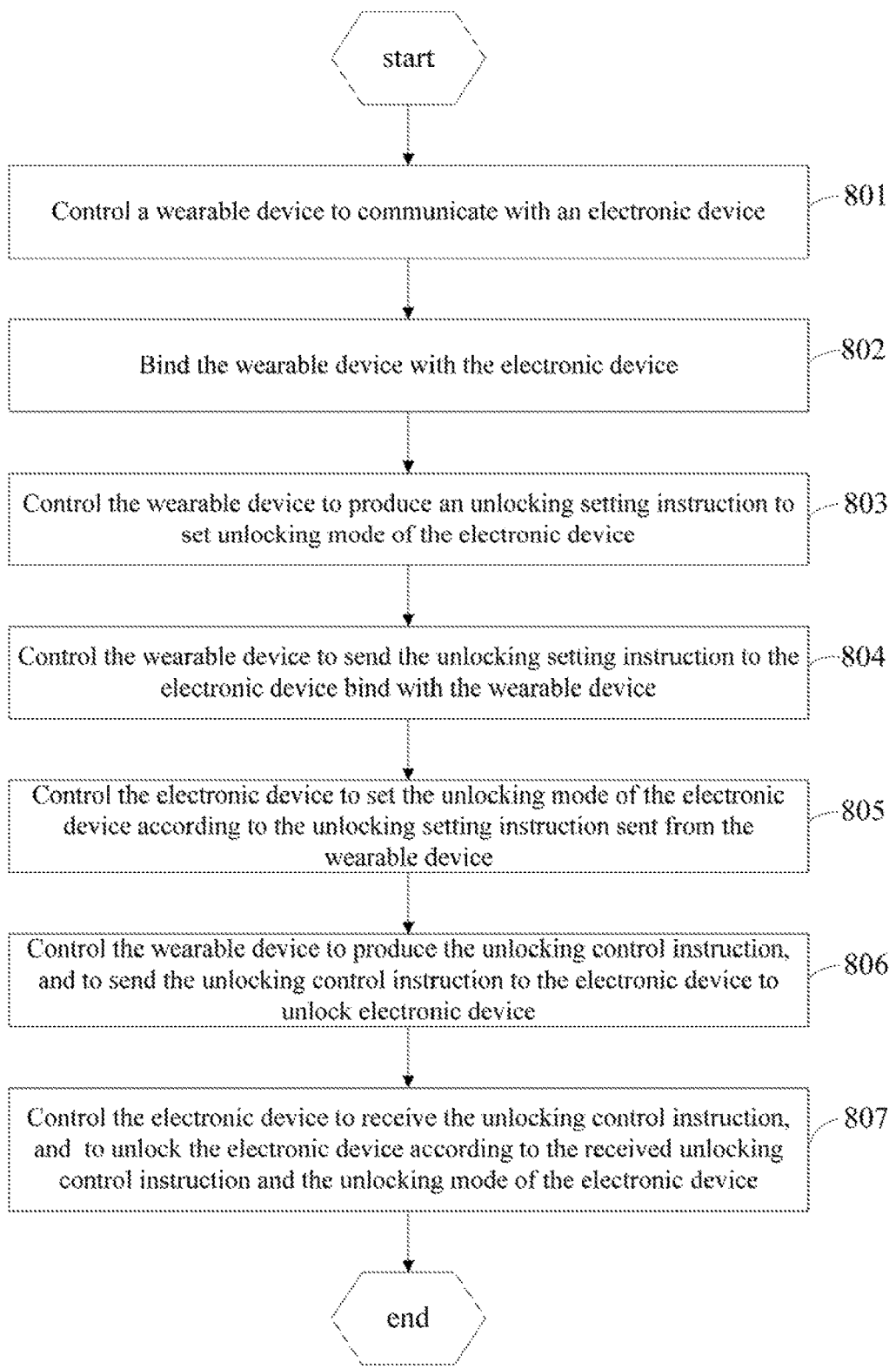
FIG. 8 is a flowchart of an exemplary embodiment of an unlocking control method.

FIG. 8 illustrates a flowchart of an exemplary embodiment of an unlocking control method. The method is provided by way of example, as there are a variety of ways to carry out the method. The method described below can be carried out using the configurations illustrated in FIGS. 1-7, for example, and various elements of these figures are referenced in explaining the example method. Each block shown in FIG. 8 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 801.

At block 801, control a wearable device to communicate with an electronic device, the wearable device and the electronic device communicates by a first communication unit of the wearable device and a second communication unit of the electronic device.

At block 802, bind the wearable device with the electronic device. The wearable device displays a binding operation interface on a display unit of the wearable device. The binding operation interface defines a binding operation option. A user can input a binding operation by selecting the binding operation option. When the user inputs the binding operation by selecting the binding operation option, the wearable device produces a binding request signal including a first identifier of the wearable device and sends the binding request signal to the electronic device. When the electronic device receives the binding request signal, the wearable device produces a response signal including the second identifier of the electronic device, and sends the response signal to the wearable device. When the wearable device receives the response signal, the wearable device is bound with the electronic device 3 by establishing a relationship between the first identifier of the wearable device and the second identifier of the electronic device.

At block 803, control the wearable device to produce an unlocking setting instruction to set the unlocking mode of the electronic device. In at least one exemplary embodiment, the wearable device displays a selection interface on the display unit to produce the unlocking setting instruction. The selection interface includes a first unlocking option and a second unlocking option. The wearable device produces a first unlocking setting instruction when the user touches the first unlocking option. The wearable device further produces a second unlocking setting instruction when the user touches the second unlocking option. In at least one exemplary embodiment, the first unlocking setting instruction is used to set the unlocking mode of the electronic device as a first unlocking mode, the second unlocking setting instruction is used to set the unlocking mode of the electronic device as a second unlocking mode. The first unlocking mode can be the sliding mode, the pattern matching mode, the fingerprint recognition mode, or a combination of the sliding mode, the pattern matching mode, and the fingerprint recognition mode. The second unlocking mode is the mode in which the electronic device is unlocked only when the unlocking control instruction sent from the wearable device is received.

At block 804, control the wearable device to send the unlocking setting instruction to the electronic device bound with the wearable device.

At block 805, control the electronic device to set the unlocking mode of the electronic device according to the unlocking setting instruction sent from the wearable device. In at least one exemplary embodiment, the wearable device sets the unlocking mode of the electronic device as the first unlocking mode when the electronic device receives the first unlocking setting instruction. The electronic device further sets the unlocking mode of the electronic device as the second unlocking mode when the electronic device 3 receives the second unlocking setting instruction.

At block 806, control the wearable device to produce the unlocking control instruction, and to send the unlocking control instruction to the electronic device to unlock electronic device. In at least one exemplary embodiment, the wearable device displays an unlocking control interface on the display unit 21 to produce the unlocking control instruction. The unlocking control interface includes a first input field and a second input field. The user can input unlocking password in the first input field. The user can define initial unlocking password in the second input field. The wearable device produces the unlocking control instruction when the user inputs the unlocking password in the first input field, and sends the unlocking control instruction to the electronic device. The wearable device further sends the initial unlocking password to the electronic device when the user inputs the initial unlocking password in the second input field.

At block 807, control the electronic device to receive the unlocking control instruction, and to unlock the electronic device according to the received unlocking control instruction and the unlocking mode of the electronic device. In at least one exemplary embodiment, when the electronic device receives the unlocking control instruction and the unlocking mode of the electronic device is in the first unlocking mode, the electronic device unlocks the electronic device with the first unlocking mode. In at least one exemplary embodiment, the first unlocking mode includes a sliding mode, a pattern matching mode, or a fingerprint recognition mode. The electronic device unlocks the electronic device with the sliding mode, pattern matching mode, or fingerprint mode. When the electronic device receives the unlocking control instruction and the unlocking mode of the electronic device is in the second unlocking mode, the electronic device unlocks the electronic device with the second unlocking mode. In at least one exemplary embodiment, when the electronic device receives the unlocking control instruction, the electronic device determines whether the electronic device is in the second unlocking mode. The electronic device unlocks the electronic device according to the unlocking control instruction sent from the wearable device when the electronic device is in the second unlocking mode. The electronic device produces a prompt message on the display unit to prompt a user to unlock the electronic device 3 with the first unlocking mode.

In the exemplary embodiment, the method further includes: the electronic device stores the initial unlocking password sent from the electronic device, compares the unlocking password with the initial unlocking password when the electronic device is in the second unlocking mode and receives the unlocking password, and unlocks the electronic device if the unlocking password is matched with the initial unlocking password.

It should be emphasized that the above-described exemplary embodiments of the present disclosure, including any particular exemplary embodiments, are merely possible examples of implementations, set forth for a clear understanding of the principles of the disclosure. Many variations and modifications can be made to the above-described exemplary embodiment(s) of the disclosure without departing substantially from the spirit and principles of the disclosure. All such modifications and variations are intended to be included herein within the scope of this disclosure and protected by the following claims.

What is claimed is:

1. A wearable device comprising:
   a communication unit;
   at least one processing unit electrically coupled to the communication unit; and
   a non-transitory storage medium coupled to the at least one processing unit and configured to store a plurality of instructions, the plurality of instructions causing the wearable device to:
   communicate with an electronic device having an unlocking function;
   bind the electronic device with the wearable device;
   display a selection interface comprising a first unlocking option and a second unlocking option on the display unit;
   produce a first unlocking setting instruction to set an unlocking mode of the electronic device as a first unlocking mode when selecting the first unlocking option;
   produce a second unlocking setting instruction to set the unlocking mode of the electronic device as a second unlocking mode when selecting the second unlocking option;
   send the first unlocking setting instruction or the second unlocking setting instruction to the electronic device bound with the wearable device; and
   produce an unlocking control instruction and send the unlocking control instruction to the electronic device to unlock the electronic device,
   wherein the first unlocking mode is a sliding mode, a pattern matching mode, or a fingerprint recognition mode, the second unlocking mode is the mode in which the electronic device is unlocked only when the unlocking control instruction sent from the wearable device is received.

2. The wearable device as recited in claim 1, further comprising a display unit, wherein the non-transitory storage medium stores a first identifier representing identification information of the wearable device, the electronic device stores a second identifier representing identification information of the electronic device, and the plurality of instructions further cause the wearable device to:
   display a binding operation interface on the display unit;
   produce a binding request signal including the first identifier of the wearable device by the binding operation interface, and send the binding request signal to the electronic device;
   receive a response signal including the second identifier of the electronic device from the electronic device; and
   bind the wearable device with the electronic device by establishing a relationship between the first identifier of the wearable device and the second identifier of the electronic device.

3. The wearable device as recited in claim 1, wherein the plurality of instructions further cause the wearable device to:
   display an unlocking control interface on the display unit to produce the unlocking control instruction; wherein the unlocking control interface comprises a first input field and a second input field.

4. The wearable device as recited in claim 3, wherein the plurality of instructions further cause the wearable device to:
   produce the unlocking control instruction when the user inputs an unlocking password in the first input field, send the unlocking control instruction to the electronic device; or
   define an initial unlocking password in the second input field, and send the initial unlocking password to the electronic device for storing.

5. An unlocking control method applied in a wearable device and an electronic device, the method comprising:
   control the wearable device to communicate with the electronic device;
   bind the wearable device with the electronic device in communication with the wearable device;
   display a selection interface comprising a first unlocking option and a second unlocking option on a display unit of the wearable device;
   produce a first unlocking setting instruction to set an unlocking mode of the electronic device as a first unlocking mode when selecting the first unlocking option;
   produce a second unlocking setting instruction to set the unlocking mode of the electronic device as a second unlocking mode when selecting the second unlocking option;
   send the first unlocking setting instruction or the second unlocking setting instruction to the electronic device bound with the wearable device, wherein the first unlocking mode is a sliding mode, a pattern matching mode, or a fingerprint recognition mode, the second unlocking mode is the mode in which the electronic device is unlocked only when the unlocking control instruction sent from the wearable device is received;
   control the wearable device to set the unlocking mode of the electronic device according to the first unlocking setting instruction or the second unlocking setting instruction sent from the wearable device;
   control the wearable device to produce an unlocking control instruction, and
   control the electronic device to receive the unlocking control instruction, and unlock the electronic device according to the received unlocking control instruction and the unlocking mode of the electronic device.

6. The method as recited in claim 5, wherein the method further comprising:
   display a binding operation interface on a display unit of the wearable device;
   produce a binding request signal including a first identifier of the wearable device by the binding operation interface, and send the binding request signal to the electronic device;
   receive a response signal including a second identifier of the electronic device from the electronic device; and
   bind the wearable device with the electronic device by establishing a relationship between the first identifier of the wearable device and the second identifier of the electronic device.

7. The method as recited in claim 5, wherein the method further comprising:
   display an unlocking control interface on the display unit to produce the unlocking control instruction; wherein the unlocking control interface comprises a first input field and a second input field;
   produce the unlocking control instruction when the user inputs an unlocking password in the first input field, and send the unlocking control instruction to the electronic device; or
   define an initial unlocking password in the second input field, and send the initial unlocking password to the electronic device for storing.

8. The method as recited in claim 7, wherein the method further comprising:
   determine whether the electronic device is in the second unlocking mode when the electronic device receives the unlocking control instruction;
   unlock the electronic device according to the unlocking control instruction sent from the wearable device when the electronic device is determined to be in the second unlocking mode; or
   produce a prompt message on the display unit to prompt a user to unlock the electronic device with the first unlocking mode when the electronic device is determined to be in the first unlocking mode.

9. The method as recited in claim 8, wherein the method further comprising:
   control the electronic device to store the initial unlocking password sent from the electronic device;
   compare the unlocking password with the initial unlocking password when the electronic device is in the second unlocking mode and receives the unlocking password; and
   unlock the electronic device when the unlocking password is matched with the initial unlocking password.

* * * * *